United States Patent
Sasaki et al.

(10) Patent No.: US 9,740,129 B2
(45) Date of Patent: Aug. 22, 2017

(54) FERRITE PARTICLES, CARRIER FOR ELECTROPHOTOGRAPHIC DEVELOPMENT USING SAME, AND DEVELOPER FOR ELECTROPHOTOGRAPHY

(71) Applicants: DOWA ELECTRONICS MATERIALS CO., LTD., Tokyo (JP); DOWA IP CREATION CO., LTD., Okayama, Okayama (JP)

(72) Inventors: Shinya Sasaki, Okayama (JP); Yohei Ishikawa, Okayama (JP); Haruka Seki, Okayama (JP)

(73) Assignees: DOWA ELECTRONICS MATERIALS CO., LTD., Tokyo (JP); DOWA IP CREATION CO., LTD., Okayama (JP)

( * ) Notice: Subject to any disclaimer, the term of this patent is extended or adjusted under 35 U.S.C. 154(b) by 0 days.

(21) Appl. No.: 15/031,944

(22) PCT Filed: Oct. 29, 2014

(86) PCT No.: PCT/JP2014/078679
§ 371 (c)(1),
(2) Date: Apr. 25, 2016

(87) PCT Pub. No.: WO2015/076076
PCT Pub. Date: May 28, 2015

(65) Prior Publication Data
US 2016/0266510 A1    Sep. 15, 2016

(30) Foreign Application Priority Data
Nov. 25, 2013   (JP) ................................. 2013-243175

(51) Int. Cl.
*G03G 9/107* (2006.01)
*H01F 1/36* (2006.01)
(Continued)

(52) U.S. Cl.
CPC ....... *G03G 9/1075* (2013.01); *C01G 49/0018* (2013.01); *C01G 49/0072* (2013.01);
(Continued)

(58) Field of Classification Search
CPC .......... G03G 9/10; G03G 9/107; G03G 9/113
See application file for complete search history.

(56) References Cited

U.S. PATENT DOCUMENTS

2012/0129087 A1* 5/2012 Iwami .................... G03G 9/107
430/106.2

FOREIGN PATENT DOCUMENTS

JP    2005-017617 A    1/2005
JP    2009-145387 A    7/2009
(Continued)

OTHER PUBLICATIONS

Jan. 20, 2015 International Search Report issued in International Patent Application No. PCT/JP2014/078679.

*Primary Examiner* — Peter Vajda
(74) *Attorney, Agent, or Firm* — Oliff PLC (57) ABSTRACT

Ferrite particles have, as a main component, a material represented by a composition formula $M_xFe_{3-x}O_4$ (where M is at least one type of metal selected from a group made of Mg, Mn, Ca, Ti, Cu, Zn, Sr and Ni, $0<x<1$), where the maximum height Rz of the particles falls within a range of 1.40 μm to 1.90 μm, and the degree of distortion Rsk of the particles falls within a range of −0.25 to −0.07. In this way, when the ferrite particles are used as the carrier of an electrophotographic image forming apparatus, even if an
(Continued)

image formation speed is increased, the occurrence of a failure is reduced for a long period of time.

6 Claims, 11 Drawing Sheets

(51) Int. Cl.
    *G03G 9/113*     (2006.01)
    *C01G 49/00*     (2006.01)

(52) U.S. Cl.
    CPC ........... *G03G 9/107* (2013.01); *G03G 9/1132* (2013.01); *G03G 9/1136* (2013.01); *H01F 1/36* (2013.01); *C01P 2004/03* (2013.01); *C01P 2004/61* (2013.01); *C01P 2006/40* (2013.01)

(56) References Cited

FOREIGN PATENT DOCUMENTS

| | | |
|---|---|---|
| JP | 2011-141542 A | 7/2011 |
| JP | 2012-168284 A | 9/2012 |
| JP | 2013-057964 A | 3/2013 |
| JP | 2014-197133 A | 10/2014 |

* cited by examiner

FERRITE PARTICLES, CARRIER FOR ELECTROPHOTOGRAPHIC DEVELOPMENT USING SAME, AND DEVELOPER FOR ELECTROPHOTOGRAPHY

TECHNICAL FIELD

The present invention relates to ferrite particles and an electrophotographic development carrier using the ferrite particles and an electrophotographic developer.

BACKGROUND ART

For example, in an image forming apparatus using an electrophotographic system, such as a facsimile, a printer or a copying machine, a toner is adhered to an electrostatic latent image formed on the surface of a photosensitive member to visualize it, the visualized image is transferred to a sheet or the like and thereafter it is fixed by being heated and pressurized. In terms of achieving high image quality and colorization, as a developer, a so-called two-component developer containing a carrier and a toner is widely used.

In a development system using a two-component developer, a carrier and a toner are agitated and mixed within a development device, and the toner is charged by friction so as to have a predetermined amount. Then, the developer is supplied to a rotating development roller, a magnetic brush is formed on the development roller and the toner is electrically moved to the photosensitive member through the magnetic brush to visualize the electrostatic latent image on the photosensitive member. The carrier after the movement of the toner is left on the development roller, and is mixed again with the toner within the development device. Hence, as the properties of the carrier, a magnetic property for forming the magnetic brush, a charging property for providing a desired charge to the toner and durability for repeated use are required.

Hence, carriers in which the surfaces of magnetic particles such as magnetite and various types of ferrite are coated with a resin are generally used. A satisfactory magnetic property is required for magnetic particles serving as a carrier core material, and moreover, a satisfactory friction charging property is required for a toner. As the carrier core material which satisfies such a property, carrier core materials having various shapes are proposed (see for example, patent documents 1 and 2).

For example, patent document 1 proposes an electrostatic charge development carrier which contains at least magnetic particles and in which the average interval Sm of projections and recesses in the surface of the magnetic particles and the maximum height Ry of the surface of the magnetic particles satisfy 3.6 μm≤Sm≤8.0 μm and 0.5 μm≤Ry≤1.0 μm.

Patent document 2 proposes an electrostatic latent image development carrier that includes magnetic particles which have projection and recesses in the surface thereof, a conductive layer which is provided in the surface of the magnetic particles, which is formed of conductive metal nanoparticles and which has, in the surface thereof, projections and recesses along the projections and recesses in the surface of the magnetic particles and a resin layer which is provided on the conductive layer. Patent document 2 also discloses magnetic particles whose surface roughness Ra is equal to or more than 0.1 μm but equal to or less than 10 μm and whose surface roughness Sm is equal to or more than 0.1 μm but equal to or less than 10 μm.

RELATED ART DOCUMENT

Patent Document

Patent Document 1: Japanese Unexamined Patent Application Publication No. 2012-168284
Patent Document 2: Japanese Unexamined Patent Application Publication No. 2011-141542

DISCLOSURE OF THE INVENTION

Problems to be Solved by the Invention

However, the carriers proposed above may not cope with the requirements of image forming apparatuses such as copying machines in recent years. Specifically, in image forming apparatuses such as an image forming apparatus which adopts a non-contact development system, an image forming apparatus which adopts a hybrid-type development system and an image forming apparatus of a so-called high-speed machine which can form 60 to 70 sheets of images per minute, for example, it is likely that a resin applied to the surface of magnetic particles comes off due to long-term use to cause a failure such as carrier scattering. When a large amount of resin is applied, charge which is charged by friction charging is unlikely to leak, and thus the capability of the charging of a toner is lowered by long-term use, with the result that a memory image may occur.

Hence, the present invention is made in view of the conventional problem described above, and an object thereof is to provide ferrite particles in which when they are used as a carrier for an electrophotographic image forming apparatus, even if an image formation speed is increased, they can be stably used over a long period of time.

Another object of the present invention is to provide an electrophotographic development carrier and an electrophotographic developer which can stably form satisfactory high-quality images even in long-term use.

Means for Solving the Problem

In order to obtain ferrite particles in which when they are used as a carrier core material for an electrophotographic image forming apparatus, even if an image formation speed is increased, they can be stably used over a long period of time, the inventors of the present application have performed thorough examinations to find that when the surface thereof is coated with a resin, the degree to which the ferrite particles are exposed to the surface significantly affects charging stability and the like. In other words, when the area in the surface of the ferrite particles coated by the resin is small, and the exposure area of the ferrite particles is excessively large, the resistance of the ferrite particles themselves is lowered, with the result that this may cause carrier scattering. On the other hand, when the exposure area of the ferrite particles is excessively small, for example, when the coating is performed completely, charge which is charged by friction charging is unlikely to leak, and thus the capability of the charging of a toner is lowered, with the result that a memory image may occur. Naturally, the resin which coats the surface of the ferrite particles is preferably prevented from coming off as much as possible.

Hence, the inventors of the present application focus attention on the shape of the surface of the ferrite particles coated with the resin, and focus attention on grains which form the concave-convex shape of the surface of the particles, that is, a difference between the peak part and the trough part of so-called crystal grains and the shape of the corner of the grains. Specifically, the inventors focus attention on the maximum height Rz which is an index of the difference between the peak part and the trough part of the grains and the degree of distortion Rsk which is an index of the degree of the distortion of the region of the peak part and the region of the trough part in the projections and recesses of the surface of the particles. The inventors have performed thorough examinations on the maximum height Rz and the degree of distortion Rsk of these elements to form the following configurations.

Specifically, according to the present invention, there are provided ferrite particles that have, as a main component, a material represented by a composition formula $M_xFe_{3-x}O_4$ (where M is at least one type of metal selected from a group consisting of Mg, Mn, Ca, Ti, Cu, Zn, Sr and Ni, 0<x<1), where the maximum height Rz of the particles falls within a range of 1.40 to 1.90, and the degree of distortion Rsk of the particles falls within a range of −0.25 to −0.07.

Moreover, according to the present invention, there is provided an electrophotographic development carrier, where the surface of the ferrite particles described above is coated with a resin.

Furthermore, according to the present invention, there is provided an electrophotographic developer, where the electrophotographic developer contains the electrophotographic development carrier described above and a toner.

Advantages of the Invention

Since in the ferrite particles of the present invention, a specific concave-convex shape is formed in the surface thereof, when they are used as a carrier core material for an electrophotographic image forming apparatus, even if an image formation speed is increased, they can be stably used over a long period of time.

With the electrophotographic development carrier and the electrophotographic developer according to the present invention, it is possible to increase the image formation speed and to achieve high quality.

DESCRIPTION OF EMBODIMENTS

Figure 1:
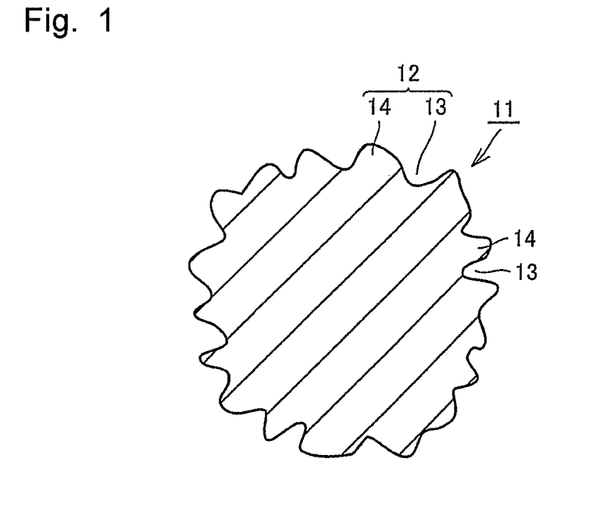
FIG. 1 A schematic cross-sectional view showing an embodiment of a ferrite particle according to the present invention.
Figure 2:
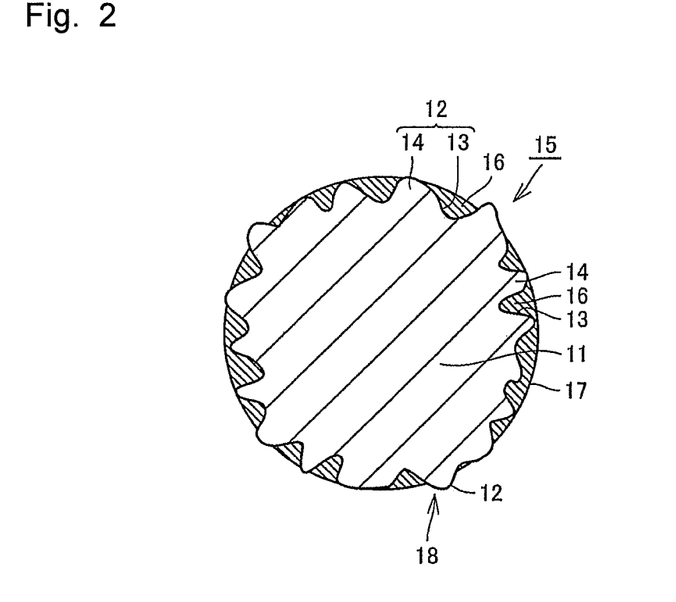
FIG. 2 A schematic cross-sectional view showing an embodiment of a carrier according to the present invention in which the surface of the ferrite particle shown in FIG. 1 is coated with a resin.

FIG. 1 shows a schematic cross-sectional view of a ferrite particle according to the present invention, and FIG. 2 shows a schematic cross-sectional view showing an embodiment of a carrier according to the present invention in which the surface of the ferrite particle shown in FIG. 1 is coated with a resin.

In the ferrite particle 11 shown in FIG. 1 and according to the present invention, the outer shape thereof is substantially spherical. In the surface 12 of the ferrite particle 11, a minute concave-convex shape is formed. Specifically, in the surface 12 of the ferrite particle 11, a concave portion 13 in which a part is recessed and a convex portion 14 which is protruded to the side of an outside diameter relative to the concave portion 13 are formed. In FIG. 1, the minute concave-convex shape is shown exaggerated in terms of ease of understanding.

Here, it is important that the maximum height Rz of the ferrite particle 11 falls within a range of 1.40 μm to 1.90 μm and that the degree of distortion Rsk falls within a range of −0.25 to −0.07. The maximum height Rz and the degree of distortion Rsk are made to fall within these ranges, and thus when the surface of the particles is coated with a resin, the desired area of the ferrite particles is exposed to the surface of the carrier. In this way, the capability of the charging of a toner is maintained over a long period of time.

Since the ferrite particle 11 described above has an appropriate concave-convex shape in the surface of the particle, specifically, a moderate difference between a peak part and a trough part in a grain and a moderate ratio between the region of the peak part and the region of the trough part, when the surface of the particle is coated with a resin, the peeling of the coating resin caused by long-term use is effectively reduced. Since a certain degree of exposure area of the ferrite particles is acquired, charge leaks moderately. Furthermore, the area coated with a resin which is large enough to maintain the amount of charge even in long-term use is acquired. Thus, it is possible to stably use the ferrite particles over a long period of time.

The diameter of the ferrite particles of the present invention is not particularly limited but the average particle diameter is preferably about several tens to several hundreds of micrometers. Preferably, when the ferrite particles of the present invention are used as a carrier core material, the particle diameter is about several tens of micrometers, and the particle size distribution is sharp.

The ferrite particles of the present invention can be used in various applications, and for example, the ferrite particles can be used as an electrophotographic development carrier, an electromagnetic wave absorption material, an electromagnetic wave shielding material powder, a rubber, a plastic filler-reinforcement material, a paint, a paint-adhesive matte material, a filler and a reinforcement material. Among them, in particular, the ferrite particles are preferably used as an electrophotographic development carrier.

A method of manufacturing the ferrite particles of the present invention is not particularly limited but a manufacturing method which will be described below is preferable.

A Fe component raw material and an M component raw material and as necessary, an additive are weighed, are put into a dispersion medium and are mixed, and thus slurry is produced. M is at least one type of metal element selected from bivalent metal elements such as Mg, Mn, Ca, Ti, Cu, Zn, Sr and Ni. As the Fe component raw material, $Fe_2O_3$ or the like is preferably used. As the M component raw material, when M is Mn, $MnCO_3$, $Mn_3O_4$ or the like can be used whereas when M is Mg, MgO, $Mg(OH)_2$ or $MgCO_3$ can be preferably used. As a Ca component raw material, at least one type of compound selected from CaO, $Ca(OH)_2$, $CaCO_3$ and the like is preferably used.

Here, in order to form the surface of the ferrite particles in a concave-convex shape, it is preferable to add a small amount of Sr. A small amount of Sr is added to partially generate Sr ferrite in a calcination process and a magnetoplumbite-type crystal structure is formed, with the result that the concave-convex shape in the surface of the ferrite particles is more likely to be facilitated. As the Sr component raw material, metal strontium or an oxide thereof can be preferably used.

As the dispersion medium used in the present invention, water is preferable. The Fe component raw material and the M component raw material and as necessary a binder, a dispersant and the like may be mixed into the dispersion medium. As the binder, for example, polyvinyl alcohol is preferably used. As the amount of binder mixed, the concentration of the binder in the slurry is preferably set at about 0.5 to 2 wt %. As the dispersant, for example, polycarboxylic acid ammonium or the like can be used. As the amount of dispersant mixed, the concentration of the dispersant in the slurry is preferably set at about 0.5 to 2 wt %. In addition, a lubricant, a sintering accelerator and the like may be mixed. The solid content concentration of the slurry preferably falls within a range of 50 to 90 wt %. Before the Fe component raw material and the M component raw material are put into the dispersion medium, as necessary, milling and mixing processing may be performed.

Then, the slurry produced as described above is wet-milled. For example, a ball mill or a vibration mill is used to perform wet-milling for a predetermined time. The average particle diameter of the milled raw material is preferably equal to or less than 50 μm and is more preferably equal to or less than 10 μm. Within the vibration mill or the ball mill, a medium having a predetermined particle diameter is preferably present. Examples of the material of the medium include an iron-based chromium steel and an oxide-based zirconia, titania and alumina. As the form of the milling step, either of a continuous type and a batch type may be used. The particle diameter of the milled material is adjusted such as by a milling time, a rotation speed, the material and the particle diameter of the medium used.

Then the milled slurry is granulated by being sprayed and dried. Specifically, the slurry is introduced into a spray drying machine such as a spray dryer, is sprayed into the atmosphere and is thereby granulated into a spherical shape. The temperature of the atmosphere at the time of the spray drying preferably falls within a range of 100 to 300° C. In this way, it is possible to obtain a spherical granulated product having a particle diameter of 10 to 200 μm. Preferably, the particle size distribution of the obtained granulated product is sharpened by removing coarse particles and fine powder with a vibrating screen or the like.

Then, the granulated product is put into a furnace heated to a predetermined temperature, and is calcined by a general method for synthesizing ferrite particles, and thus ferrite particles are generated. Here, the calcination temperature preferably falls within a range of 1000 to 1300° C. A temperature increasing rate until the calcination temperature is reached preferably falls within a range of 250 to 500° C./h. The concentration of oxygen in the calcination atmosphere preferably falls within a range of 2 to 21%. Moreover, when the granulated product is put into a tray, and calcination is performed, it is recommended that the thickness of the granulated product put into the tray be set equal to or less than 100 mm.

The calcined product obtained as described above is deagglomerated as necessary. Specifically, for example, a hammer mill or the like is used to deagglomerate the calcined product. As the form of the deagglomeration step, either of a continuous type and a batch type may be used. Then, as necessary, in order for the diameter of the particles to fall within a predetermined range, classification may be performed. As a classification method, a conventional known method such as air classification or sieve classification can be used. After primary classification is performed with an air classifier, with a vibration sieve or an ultrasonic sieve, the particle diameter may be made to fall into a predetermined range. Furthermore, after the classification step, non-magnetic particles may be removed with a magnetic beneficiation machine.

Thereafter, as necessary, the powder (calcined product) after the classification is heated in an oxidizing atmosphere, and thus an oxide layer is formed on the surface of the particles, with the result that the resistance of the ferrite particles may be increased (resistance increasing processing). As the oxidizing atmosphere, either of the atmosphere and the mixed atmosphere of oxygen and nitrogen may be used. The heating temperature preferably falls within a range of 200 to 800° C., and further preferably falls within a range of 250 to 600° C. The heating time preferably falls within a range of 0.5 to 5 hours.

When the ferrite particles of the present invention produced as described above are used as an electrophotographic development carrier, though the ferrite particles can be used as the electrophotographic development carrier without being processed, in terms of chargeability or the like, the surface of the ferrite particles is coated with a resin, and then the ferrite particles are used.

FIG. 2 shows a schematic cross-sectional view showing an embodiment of the carrier according to the present invention in which the surface of the ferrite particle is coated with a resin. In FIG. 2, the carrier 15 is formed by thinly coating the surface 12 of the ferrite particle 11 with the resin 16. The particle diameter of the carrier 15 is substantially equal to that of the ferrite particle 11. Although most of the surface 17 of the carrier 15 is coated with the resin 16, at a region 18 which is a part thereof, the surface 12 of the ferrite particle 11 itself is exposed.

As the resin with which the surface of the ferrite particles is coated, a conventional known resin can be used. Examples thereof include polyethylene, polypropylene, polyvinyl chloride, poly-4-methylpentene-1, polyvinylidene chloride, ABS (acrylonitrile-butadiene-styrene) resin, polystyrene, (meth) acrylic resin, polyvinyl alcohol-based resin, thermoplastic elastomers such as polyvinyl chloride-based, polyurethane-based, polyester-based, polyamide-based and polybutadiene-based thermoplastic elastomers and fluorine silicone-based resins.

In order to coat the surface of the ferrite particles with the resin, a solution of the resin or a dispersion solution is preferably applied to the ferrite particles. As a solvent for the coating solution, one or two or more types of the followings can be used: aromatic hydrocarbon-based solvents such as toluene and xylene; ketone-based solvents such as acetone, methyl ethyl ketone, methyl isobutyl ketone and cyclohexanone; cyclic ether solvents such as tetrahydrofuran and dioxane; alcohol-based solvents such as ethanol, propanol and butanol; cellosolve-based solvents such as ethyl cellosolve and butyl cellosolve; ester-based solvents such as ethyl acetate and butyl acetate; and amide-based solvents such as dimethyl formamide and dimethylacetamide. The concentration of the resin component in the coating solution generally falls within a range of 0.001 to 30 wt %, and particularly preferably falls within a range of 0.001 to 2 wt %.

As a method of coating the ferrite particles with the resin, for example, a spray dry method, a fluidized bed method, a spray dry method using a fluidized bed and a dipping method can be used. Among them, the fluidized bed method is particularly preferable because it is possible to efficiently perform coating even with a small amount of resin. For example, in the case of the fluidized bed method, the amount of resin applied can be adjusted by the amount of resin solution sprayed and a spraying time.

With respect to the particle diameter of the carrier, its volume average particle diameter generally falls within a range of 10 to 200 μm, and particularly preferably falls within a range of 10 to 50 μm.

The electrophotographic developer according to the present invention is formed by mixing the carrier produced as described above and a toner. The mixing ratio between the carrier and the toner is not particularly limited, and is preferably determined, as necessary, from development conditions of a development device used or the like. In general, the concentration of the toner in the developer preferably falls within a range of 1 to 15 wt %. This is because when the concentration of the toner is less than 1 wt %, an image density is excessively lowered whereas when the concentration of the toner exceeds 15 wt %, the toner is scattered within the development device, and thus a stain within the apparatus may be produced or a failure may occur in which the toner is adhered to a background part of transfer paper or the like. The concentration of the toner more preferably falls within a range of 3 to 10 wt %.

As the toner, a toner can be used which is manufactured by a conventional known method such as a polymerization method, a milling/classification method, a melting granulation method or a spray granulation method. Specifically, a toner can be preferably used in which a coloring agent, a mold release agent, a charge control agent and the like are contained in a binder resin whose main component is a thermoplastic resin.

With respect to the particle diameter of the toner, in general, its volume average particle diameter by a coulter counter preferably falls within a range of 5 to 15 μm, and more preferably falls within a range of 7 to 12 μm.

A modifier may be added to the surface of the toner as necessary. Examples of the modifier include silica, alumina, zinc oxide, titanium oxide, magnesium oxide and polymethyl methacrylate. One or two or more types thereof can be combined and used.

The mixing of the carrier and the toner can be performed with a conventional known mixing device. For example, a Henschel mixer, a V-type mixer, a tumbler mixer and a hybridizer can be used.

EXAMPLES

Example 1

Ferrite particles were produced by the following method. As starting materials, 10.75 kg of $Fe_2O_3$, 4.38 kg of $Mn_3O_4$, 0.35 kg of MgO and 0.019 kg of $SrCO_3$ were dispersed in 5.10 kg of pure water, and 62 g of carbon black serving as a reducing agent, 93 g of a polycarboxylic acid ammonium-based dispersant serving as a dispersant and 33 g of polyvinyl alcohol serving as a binder were added, with the result that a mixture was obtained. This mixture was subjected to milling processing using a wet ball mill (medium diameter of 2 mm), and thus a mixed slurry was obtained.

The mixed slurry was sprayed with a spray drier into hot air of about 130° C., and thus a dried granulated product having a particle diameter of 10 to 100 μm was obtained. Coarse particles whose diameter exceeded 100 μm were removed from the granulated product with a sieve screen.

The granulated product was put into an electric furnace, its temperature was increased up to 1200° C. for 2.5 hours, thereafter it was held at 1200° C. for 3 hours and calcination was performed. Here, the concentration of oxygen within the electric furnace was set at 21% (the atmosphere), and the thickness of the layer of the granulated product within a tray was set at 30 mm.

The obtained calcined product was deagglomerated with a hammer mill and was then classified with a vibrating screen, and thus ferrite particles whose average diameter was 35.2 μm were obtained.

Figure 3:
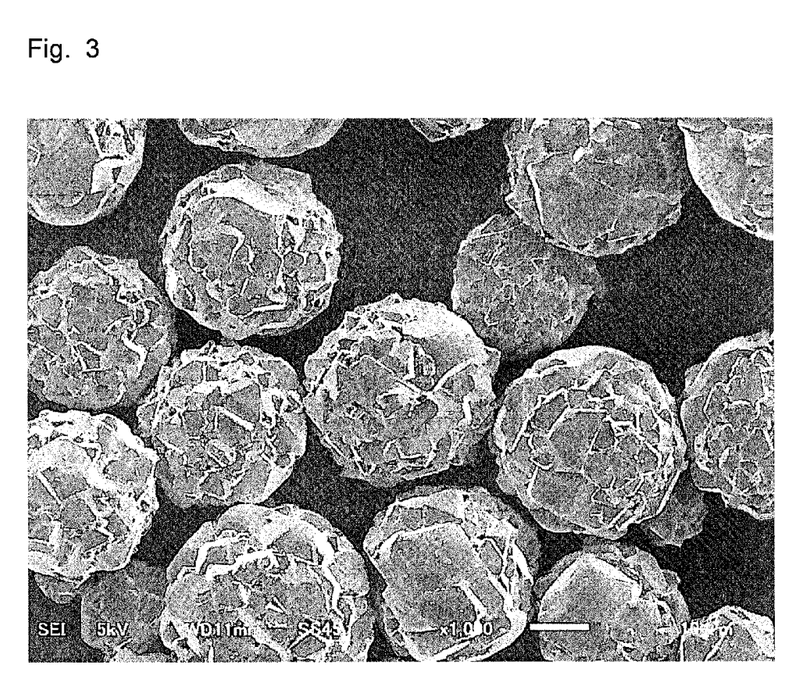
FIG. 3 A SEM photograph of ferrite particles in example 1.
Figure 4:
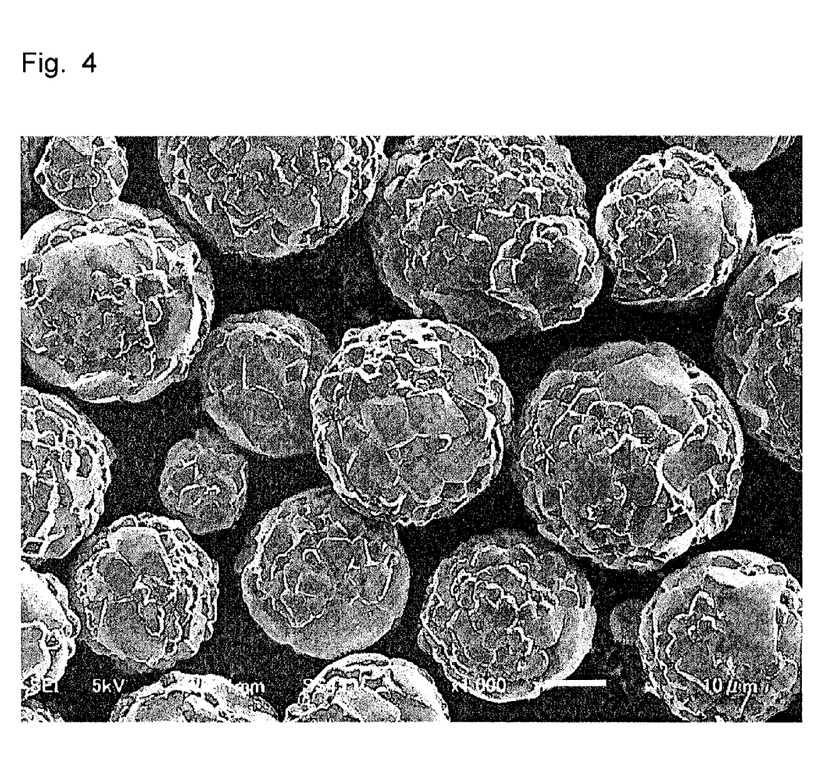
FIG. 4 A SEM photograph of ferrite particles in example 4.
Figure 5:
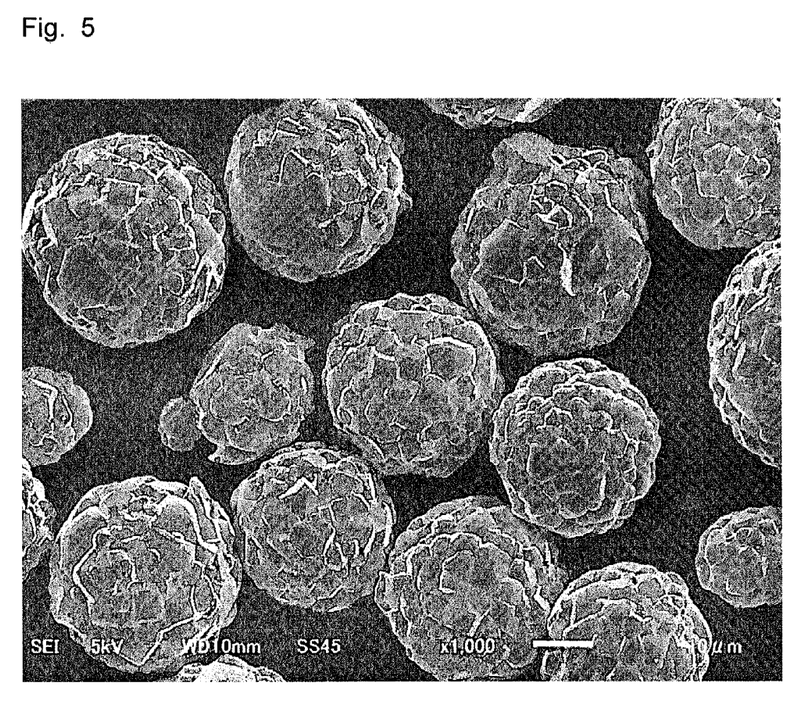
FIG. 5 A SEM photograph of ferrite particles in example 6.
Figure 6:
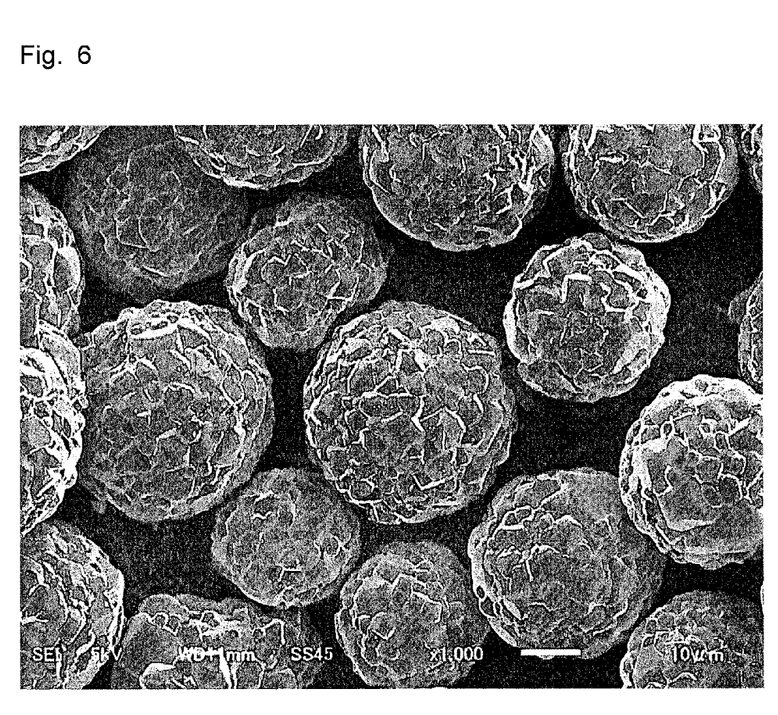
FIG. 6 A SEM photograph of ferrite particles in example 7.
Figure 7:
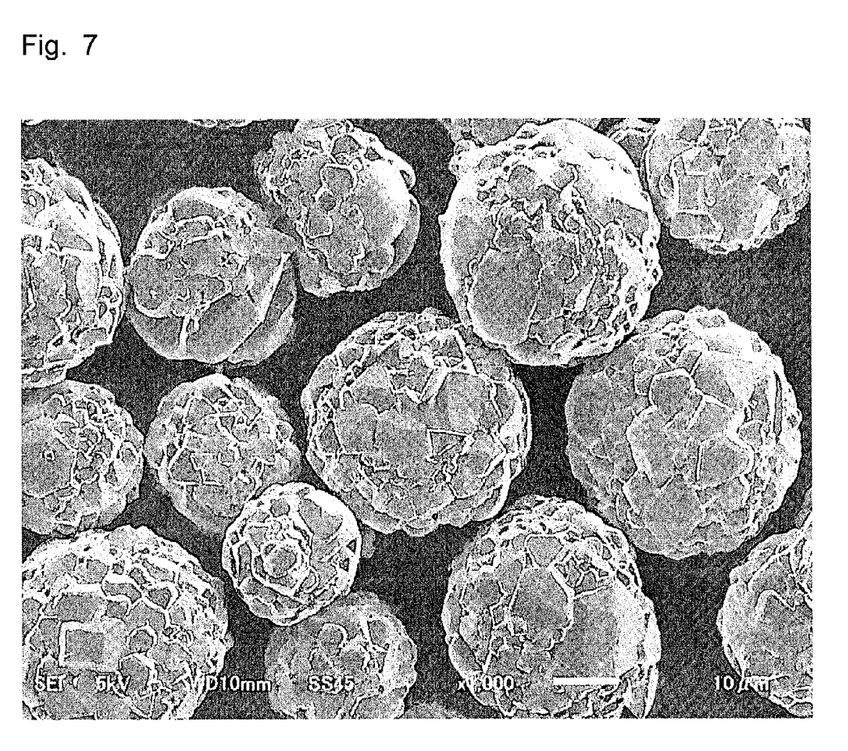
FIG. 7 A SEM photograph of ferrite particles in example 8.
Figure 8:
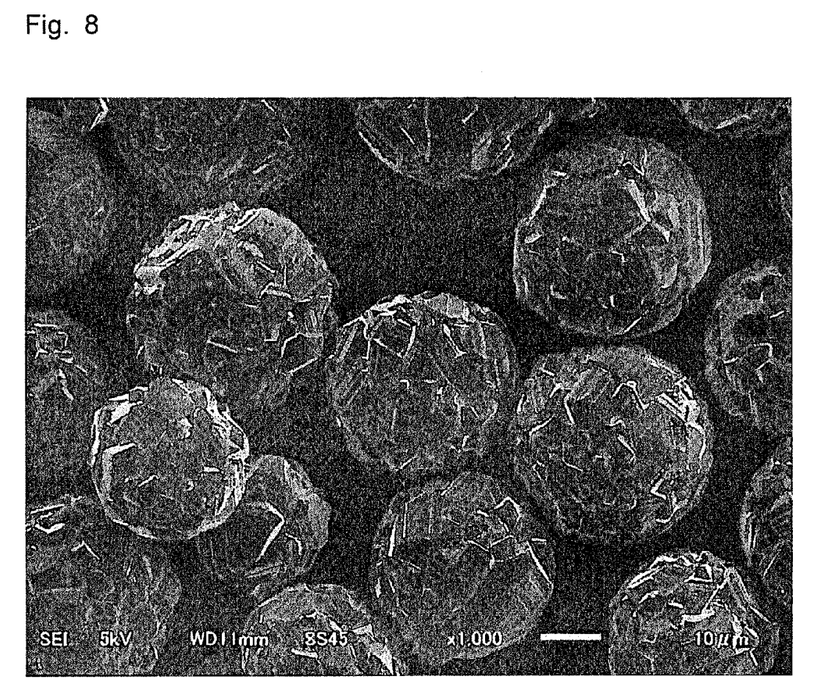
FIG. 8 A SEM photograph of ferrite particles in example 10.

The maximum height Rz, the degree of distortion Rsk and the magnetic properties of the obtained ferrite particles were measured with methods which will be described later. The results of the measurements are collectively shown in table 2. FIG. 3 shows a SEM photograph of the ferrite particles in example 1.

Then, the surface of the ferrite particles of example 1 obtained as described above was coated with a resin, and thus the carrier of example 1 was produced. Specifically, 450 weight parts of a silicone resin and 9 weight parts of (2-aminoethyl) aminopropyl trimethoxysilane were dissolved in 450 weight parts of toluene serving as a solvent, and thus a coat solution was produced. The coat solution was applied to 50000 weight parts of the ferrite particles of example 1 with a fluidized bed-type coating device, and was heated in an electric furnace whose temperature was 300° C., and thus the carrier of example 1 was obtained. Thereafter, the same processing was performed in all examples and comparative examples, and thus carriers were obtained.

The obtained carrier and the toner whose average particle diameter was about 5.0 μm were mixed with a pot mill for a predetermined time, and thus a two-component electrophotographic developer according to example 1 was obtained. In this case, the carrier and the toner were adjusted such that weight of toner/(weight of toner and carrier)=5/100, Thereafter, the same processing was performed in all examples and comparative examples, and thus developers were obtained. On the obtained developers, actual evaluation in the apparatus which will be described later was performed. The results of the evaluation are also shown in table 2.

Examples 2 to 10 and Comparative Examples 1 to 3

Figure 9:
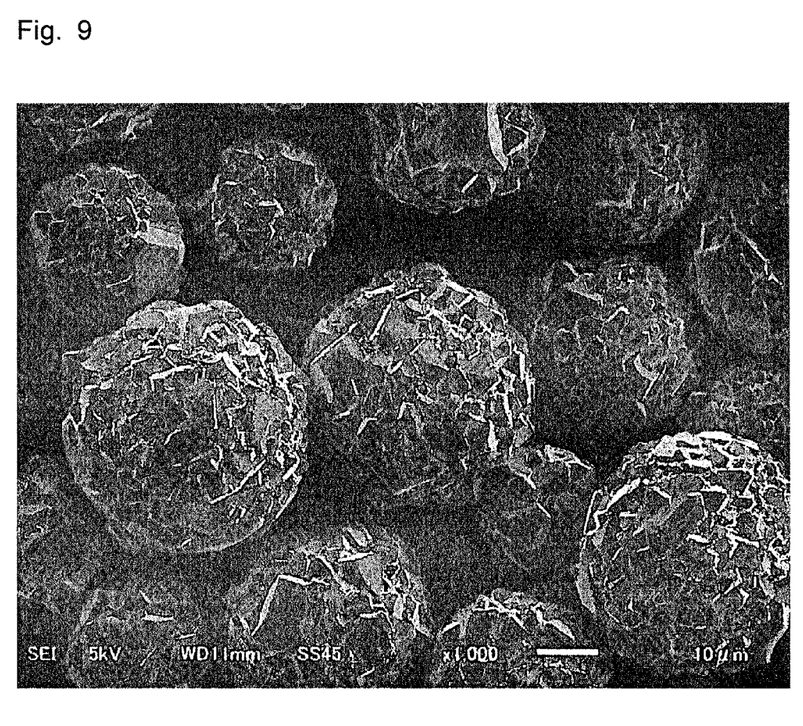
FIG. 9 A SEM photograph of ferrite particles in comparative example 1.
Figure 10:
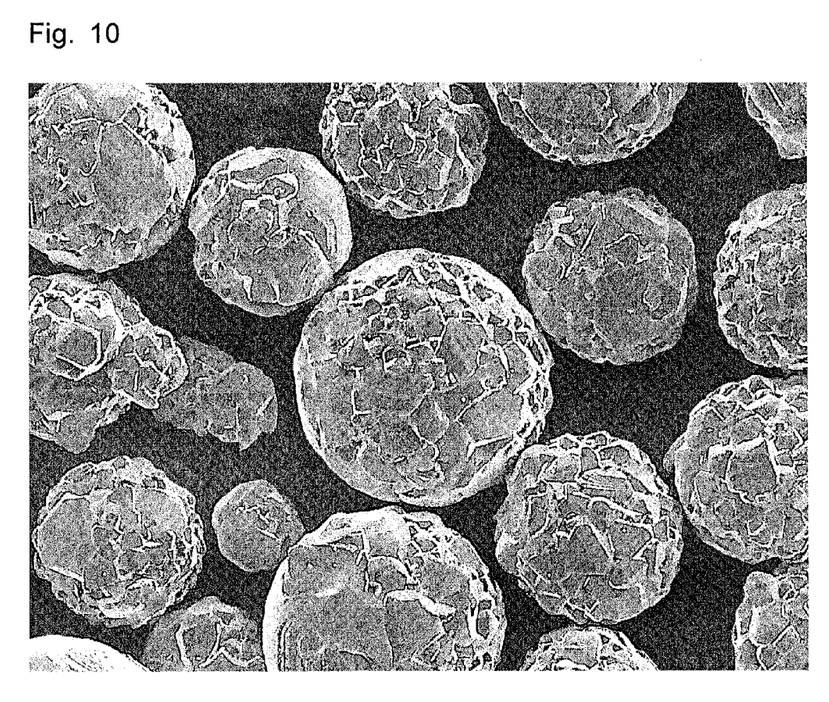
FIG. 10 A SEM photograph of ferrite particles in comparative example 2.
Figure 11:
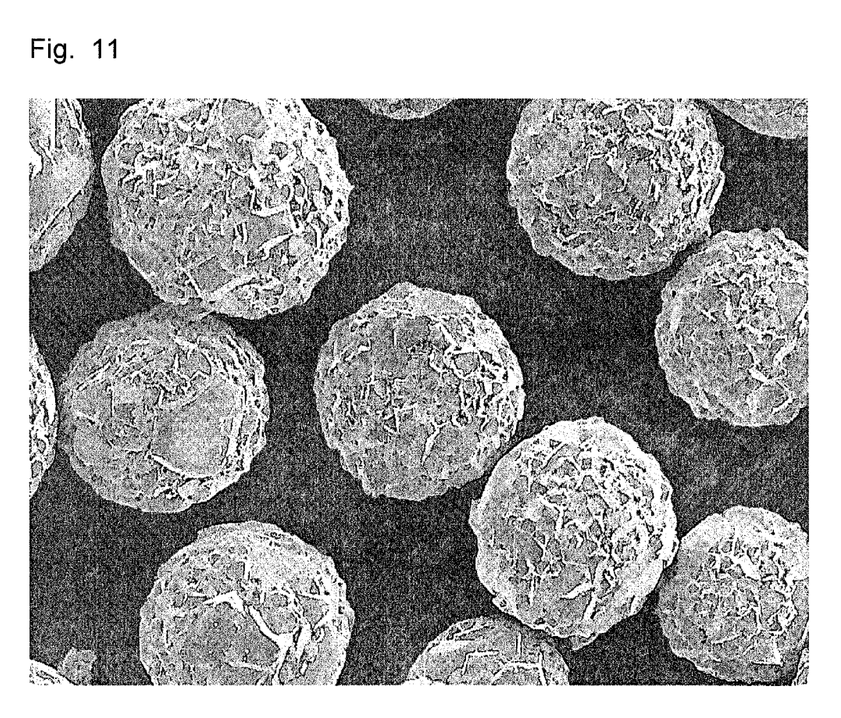
FIG. 11 A SEM photograph of ferrite particles in comparative example 3.
Figure 12:
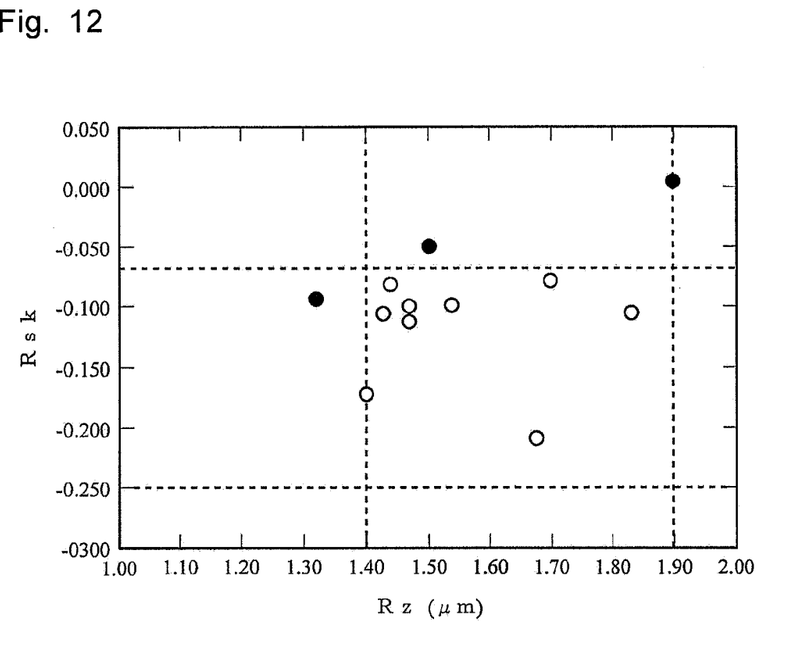
FIG. 12 A graph showing a relationship between the maximum height Rz and the degree of distortion Rsk of the ferrite particles.

With the starting materials, the mixed amounts and the calcination temperatures shown in table 1, as in example 1, ferrite particles were produced. Then, as in example 1, the physical properties were measured. The results of the measurements are shown in table 2. FIGS. 4 to 8 show SEM photographs of ferrite particles in examples 4, 6, 7 8 and 10. Furthermore, FIGS. 9 to 11 show SEM photographs of ferrite particles in comparative examples 1 to 3. FIG. 12 shows a graph in which the vertical axis represents the degree of distortion Rsk of particles, the horizontal axis represents the maximum height Rz of the particles and the values of the ferrite particles in examples 1 to 10 and comparative examples 1 to 3 were plotted.

(Measurement of Volume Average Diameter)

The measurement of the volume average particle diameter was performed with Microtrack model 9320-X100 made by Nikkiso Co., Ltd.

(Measurement of Magnetic Force)

With respect to the measurement of magnetization indicting magnetic properties in table 2, a VSM (made by Toei Industry Co., Ltd., VSM-P7) was used to measure saturated magnetization σs, magnetization $\sigma_{1k}$, residual magnetization σr and a coercive force He.

(Measurement of Apparent Density)

The apparent density of the ferrite particles was measured in conformity with JIS Z 2504.

(Measurement of Maximum Height Rz and Degree of Distortion Rsk)

The maximum height Rz and the degree of distortion Rsk of the ferrite particles were measured as follows. They were determined by using an ultra-deep color 3D shape measuring microscope ("VK-X100" made by Keyence Corporation) to observe the surface thereof with a 100-times objective lens. Specifically, the ferrite particles were first fixed to an adhesive tape having a flat surface, a measured view was determined with the 100-times objective lens, then an autofocus function was used to adjust a focal point to the surface of the adhesive tape and an auto-shooting function was used to capture a three-dimensional shape in the surface of the ferrite particles.

Figure 13:
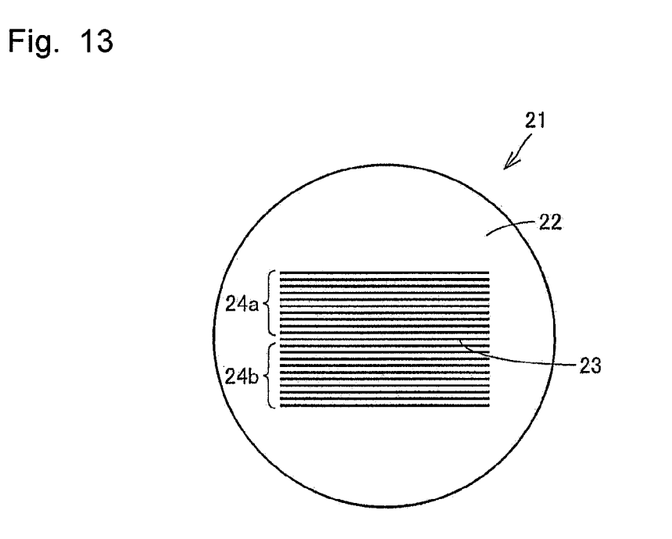
FIG. 13 A schematic diagram showing the surface of the ferrite particle.

Individual parameters were measured with software VK-H1XA attached to the apparatus. First, as preprocessing, a portion used for analysis was taken out from the obtained three-dimensional shape in the surface of the ferrite particles. FIG. 13 shows a schematic diagram of the surface of the ferrite particle which was taken out. A line segment 23 whose length was 15.0 μm and which was extended in a horizontal direction was drawn in the center part of the surface 22 of the ferrite particle 21, and a total of 21 roughness curves were taken out which were on the line segments when 10 parallel lines were added at intervals of 4 lines to each of the upper and lower sides. In FIG. 13, the 10 line segments 24a on the upper side and the 10 line segments 24b on the lower side are shown in a simplified manner.

Since the ferrite particle had a substantially spherical shape, the roughness curve taken out had a constant curvature as a background. Hence, as the correction of the background, a correction was made in which an optimum quadratic curve was fitted and was subtracted from the roughness curve. In this case, a cutoff value Xs was set at 0.25 μm and a cutoff value λc was set at 0.08 mm.

The maximum height Rz was determined as the sum of the height of the highest peak and the depth of the deepest trough in the roughness curve.

The degree of distortion Rsk was calculated by substitution of the roughness curve in formula 1 below.

$$Rsk = \frac{1}{Rq^3}\left(\frac{1}{N}\right)\sum_{n=1}^{N} Rn^3 \qquad \text{[Formula 1]}$$

Here, in formula 1, Rn represents a difference between a reference length of 15 μm and the average line of the nth peak or trough, and a root-mean-square height Rq is determined by formula 2 below.

$$Rq = \sqrt{\frac{1}{N}\sum_{n=1}^{N} Rn^2} \qquad \text{[Formula 2]}$$

Here, the degree of distortion Rsk obtained indicates that as its value is increased, further distortion occurs toward a region located at the trough.

Furthermore, the root-mean-square inclined angle RΔq of the ferrite particle was also calculated. Specifically, the root-mean-square inclined angle RΔq was calculated by substitution of the roughness curve in formula 3 below.

$$R\Delta q = \sqrt{\frac{1}{N}\sum_{n=1}^{N}\left(\frac{dRn}{dXn}\right)^2} \qquad \text{[Formula 3]}$$

Here in formula 3, dRn/dXn represents the local inclination of the nth peak or trough with respect to the reference length of 15 μm, and is basically determined by a 7-piunt formula indicated by formula 4 below.

$$\frac{dR_i}{dX_i} = \frac{(R_{i+3} - 9R_{i+2} + 45R_{i+1} - 45R_{i-1} + 9R_{i-2} - R_{i-3})}{60X} \qquad \text{[Formula 4]}$$

Here, the root-mean-square inclined angle RΔq obtained indicates that as its value is increased, the inclination is increased.

The measurements of the maximum height Rz, the degree of distortion Rsk and the root-mean-square inclined angle RΔq described above were performed in conformity with JIS B0601 (2001 edition).

The average particle diameter of the ferrite particles used for analysis was limited to 32.0 to 34.0 μm. As described above, the average particle diameter of the ferrite particles to be measured is limited to the narrow range, and thus it is possible to reduce an error caused by a residue produced when the curvature is corrected. As the average value of the individual parameters, the average value of 30 particles was used.

(Actual Evaluation in Apparatus)

500 g of the produced developer was put into an evaluation apparatus equivalent to a 70-sheet apparatus (70 cpm) which was modified such that an alternating-current bias was applied in a development region and which adopted a digital inversion development system, 1000 sheets of characters and solid black images were printed and a memory image in a solid image portion of the 1000th sheet was evaluated visually. Criteria were as follows.

"⊚": Case where a solid image is satisfactorily reproduced

"〇": Case where fading occurs very slightly but there is no problem on actual use "Δ": Case where printing can be slightly read "x": Case where printing can be clearly read

TABLE 1

|  | Fe$_2$O$_3$ kg | Mn$_3$O$_4$ kg | MgO kg | SrCO$_3$ kg | CaCO$_3$ kg | Calcination temperature ° C. | Oxygen concentration % |
|---|---|---|---|---|---|---|---|
| Example 1 | 10.75 | 4.38 | 0.35 | 0.019 |  | 1200 | 21 |
| Example 2 | 10.75 | 4.41 | 0.37 | 0.036 |  | 1200 | 21 |
| Example 3 | 10.75 | 3.50 | 0.75 | 0.035 |  | 1200 | 21 |
| Example 4 | 10.75 | 3.74 | 0.32 | 0.034 |  | 1200 | 3 |
| Example 5 | 10.75 | 3.73 | 0.30 | 0.039 | 0.040 | 1200 | 3 |
| Example 6 | 10.75 | 3.80 | 0.30 | 0.035 | 0.070 | 1200 | 3 |
| Example 7 | 10.75 | 3.79 | 0.30 | 0.033 |  | 1225 | 3 |
| Example 8 | 10.75 | 3.71 | 0.30 | 0.037 | 0.040 | 1170 | 3 |
| Example 9 | 10.75 | 4.88 |  | 0.107 |  | 1200 | 3 |
| Example 10 | 10.75 | 4.40 | 0.37 | 0.000 |  | 1200 | 21 |
| Comparative example 1 | 10.75 | 4.39 | 0.37 | 0.096 |  | 1200 | 21 |
| Comparative example 2 | 10.75 | 3.50 | 0.75 | 0.000 |  | 1200 | 21 |
| Comparative example 3 | 10.75 | 3.49 | 0.74 | 0.091 |  | 1200 | 21 |

TABLE 2

|  | Volume average diameter μm | Apparent density g/cm$^3$ | σs Am$^2$/kg | σ1k Am$^2$/kg | σr Am$^2$/kg | Hc A/m × 10$^3$/4π | Rz μm | Rsk | RΔq | Memory image |
|---|---|---|---|---|---|---|---|---|---|---|
| Example 1 | 35.2 | 2.19 | 62.3 | 55.8 | 0.6 | 7.0 | 1.70 | −0.08 | 0.59 | ○ |
| Example 2 | 34.8 | 2.20 | 61.1 | 55.0 | 0.7 | 7.8 | 1.83 | −0.10 | 0.66 | ⊙ |
| Example 3 | 36.6 | 2.23 | 55.8 | 50.7 | 0.6 | 7.5 | 1.54 | −0.10 | 0.66 | ○ |
| Example 4 | 35.2 | 2.20 | 72.8 | 62.5 | 0.5 | 5.6 | 1.40 | −0.17 | 0.60 | ○ |
| Example 5 | 35.1 | 2.17 | 72.6 | 61.5 | 0.7 | 7.6 | 1.43 | −0.11 | 0.54 | ○ |
| Example 6 | 35.3 | 2.22 | 71.5 | 60.2 | 0.9 | 9.9 | 1.43 | −0.11 | 0.57 | ○ |
| Example 7 | 33.8 | 2.23 | 72.3 | 61.9 | 0.5 | 5.5 | 1.67 | −0.21 | 0.68 | ⊙ |
| Example 8 | 35.0 | 2.22 | 72.5 | 61.6 | 0.8 | 4.4 | 1.44 | −0.08 | 0.59 | ○ |
| Example 9 | 33.8 | 2.32 | 71.9 | 60.9 | 0.8 | 9.5 | 1.47 | −0.11 | 0.63 | ○ |
| Example 10 | 35.0 | 2.24 | 62.7 | 56.6 | 0.5 | 5.0 | 1.47 | −0.10 | 0.52 | ○ |
| Comparative example 1 | 34.4 | 2.17 | 58.8 | 52.2 | 1.0 | 11.5 | 1.90 | 0.00 | 0.83 | Δ |
| Comparative example 2 | 35.9 | 2.20 | 58.4 | 52.9 | 0.5 | 5.2 | 1.32 | −0.10 | 0.62 | X |
| Comparative example 3 | 36.3 | 2.22 | 55.3 | 49.6 | 0.8 | 10.2 | 1.50 | −0.05 | 0.67 | X |

INDUSTRIAL APPLICABILITY

The ferrite particles according to the present invention are useful because since a specific concave-convex shape is formed in the surface thereof, when they are used as a carrier core material for an electrophotographic image forming apparatus, even if an image formation speed is increased, they can be stably used over a long period of time.

REFERENCE SIGNS LIST 11 ferrite particles
12 particle surface
13 concave portion
14 convex portion
15 carrier
16 resin

The invention claimed is:

1. Ferrite particles comprising
grains that include, as a main component, a material represented by a composition formula $M_xFe_{3-x}O_4$ where M is at least one type of metal selected from the group consisting of Mg, Mn, Ca, Ti, Cu, Zn, Sr and Ni, and $0<x<1$,
wherein a maximum height Rz of a concave-convex-shaped surface of the grains is within a range of 1.40 μm to 1.90 μm, and a degree of distortion Rsk of the particles is within a range of −0.25 to −0.07.

2. An electrophotographic development carrier, comprising
the ferrite particles according to claim 1 coated with a resin.

3. An electrophotographic developer, comprising
the electrophotographic development carrier according to claim 2 and a toner.

4. The ferrite particles according to claim 1, wherein the material represented by the composition formula $M_xFe_{3-x}O_4$ is present throughout the grains.

5. The ferrite particles according to claim 1, wherein M includes Sr.

6. The ferrite particles according to claim 1, wherein an apparent density of the particles is within a range of 2.17 to 2.32 g/cm$^3$.

* * * * *